April 28, 1964 W. K. FRENCH 3,131,291

ASSOCIATIVE MEMORY

Filed July 11, 1960 4 Sheets-Sheet 1

INVENTOR

Walter K. French

BY Sughrue, Rothwell, Mion & Zinn

ATTORNEYS

April 28, 1964 W. K. FRENCH 3,131,291

ASSOCIATIVE MEMORY

Filed July 11, 1960 4 Sheets-Sheet 2

April 28, 1964 W. K. FRENCH 3,131,291

ASSOCIATIVE MEMORY

Filed July 11, 1960 4 Sheets-Sheet 3

| | | | |
|---|---|---|---|
| + | OPEN | + | ADD. |
| + | + | OPEN | STEP 1 |
| OPEN | OPEN | + | STEP 2 |
| OPEN | OPEN | + | STEP 3 |
| + | + | OPEN | STEP 4 |

April 28, 1964 W. K. FRENCH 3,131,291

ASSOCIATIVE MEMORY

Filed July 11, 1960 4 Sheets-Sheet 4

3,131,291

ASSOCIATIVE MEMORY

Walter K. French, Montrose, N.Y., assignor to International Business Machines Corporation, New York, N.Y., a corporation of New York

Filed July 11, 1960, Ser. No. 42,005
5 Claims. (Cl. 235—61.11)

This invention relates to an associative memory system and more particularly to a system for reading out of an associative memory a word having an identification tag corresponding to the particular identification tag fed to the input to the memory.

In an associative memory each word is stored therein at an arbitrary or unknown location and has associated therewith an identification tag peculiar to it. When this word is desired, the memory is "addressed" at its input with a tag corresponding to the identification tag of said desired word. A comparison is indicated between the identification tag of the desired word and the tag at the input to the memory and read-out of the data digits associated with the word is achieved. In a fully associative memory, such as the one described herein, the tag may be in any position in the word, not necessarily consecutive digits. Furthermore, the position of this tag may be different on successive scans of the memory.

In accordance with the present invention, information is stored in the memory in the form of holes or no-holes in a record such as a punched card. The card is divided into rows and columns in the usual fashion. Each column designates a separate word. A tag portion of each column contains the tag digits and the data portion contains the data digits. The word is composed of tag digits and data digits. The card is operatively associated with X and Y coordinate electrodes corresponding respectively to the rows and columns of the card. A hole or a no-hole in a card will cause an electrical association between a related X and Y conductor intersection point. By feeding to the tag digit lines at the input to the memory an identification tag indicative of a desired word, only that word having the corresponding identification tag associated therewith will produce at the output of the system the data digits contained in the word.

In accordance with the present invention, the X and Y coordinate electrodes are composed respectively of strips of electroluminescent material and strips of photoconductive material. A hole at a coordinate point will couple the luminescence of a coordinate X strip to the coordinate Y photoconductive strip. This, in the usual fashion, reduces the impedance of the photoconductive strip, which reduction in impedance is an indication of the hole at said intersection point. The optical coupling between the X and Y strips as a function of the holes in a record card interposed therebetween determines the setting up of read-out circuitry for reading out the data digits associated with the identification tag.

The associative memory of this invention has a number of advantages. The word capacity may be quite high per unit volume. The access time is extremely low. Then, too, the memory system is easy to construct and maintain and is relatively inexpensive.

It is therefore one object of this invention to provide an associative memory which has a large word capacity per unit volume and in which the words may be stored at arbitrary or unknown locations in the memory.

It is another object of this invention to provide such a memory in which each word is composed of digits which at the beginning of each memory search may be divided arbitrarily into tag digits and data digits and in which a comparison of input tag digits to the memory is made with all of the word tag digits stored in the memory to select a single desired word wherein the data digits associated with this desired word are read out. In subsequent scan some of these data digits may be used as tag digits and similarly some of the tag digits may be used as data digits. The comparison results in the setting up of read-out circuitry peculiar to the desired word while inhibiting the read-out circuitry associated with the undesired words.

Another object of the invention is to provide parallel inputs in the form of tag digits to the memory and to perform parallel comparisons with all of the word tags in the memory to select only one of said words and to achieve serial read-out of the data digits asociated with the desired word.

Another object of the invention is to provide a system of the type mentioned above in which punched cards or tapes are used to store the words.

Another object of the invention is to provide a system in which punched cards or tapes are incorporated into a sandwich arrangement with X and Y coordinate electrodes which form discrete optical couplings between the X and Y intersecting points as determined by the punched holes in the cards or tapes and in which an input tag selects a particular word to achieve read-out of the data digits of this particular word.

These and other objects of the invention will become apparent from a detailed description of the accompanying drawings.

In the drawings:

FIGURE 1*a* is a perspective view of one embodiment of the invention showing the three members of the memory in spaced relation for a clearer illustration of the construction of the members;

FIGURE 1*b* is a fragmentary cross section of the Y photoconductive strips showing the manner in which electrical leads are attached thereto;

FIGURE 1*c* is a diagrammatic illustration of the means of supplying an A.C. signal to the electroluminescent X strips;

Figures 1A, 1B, 1C:
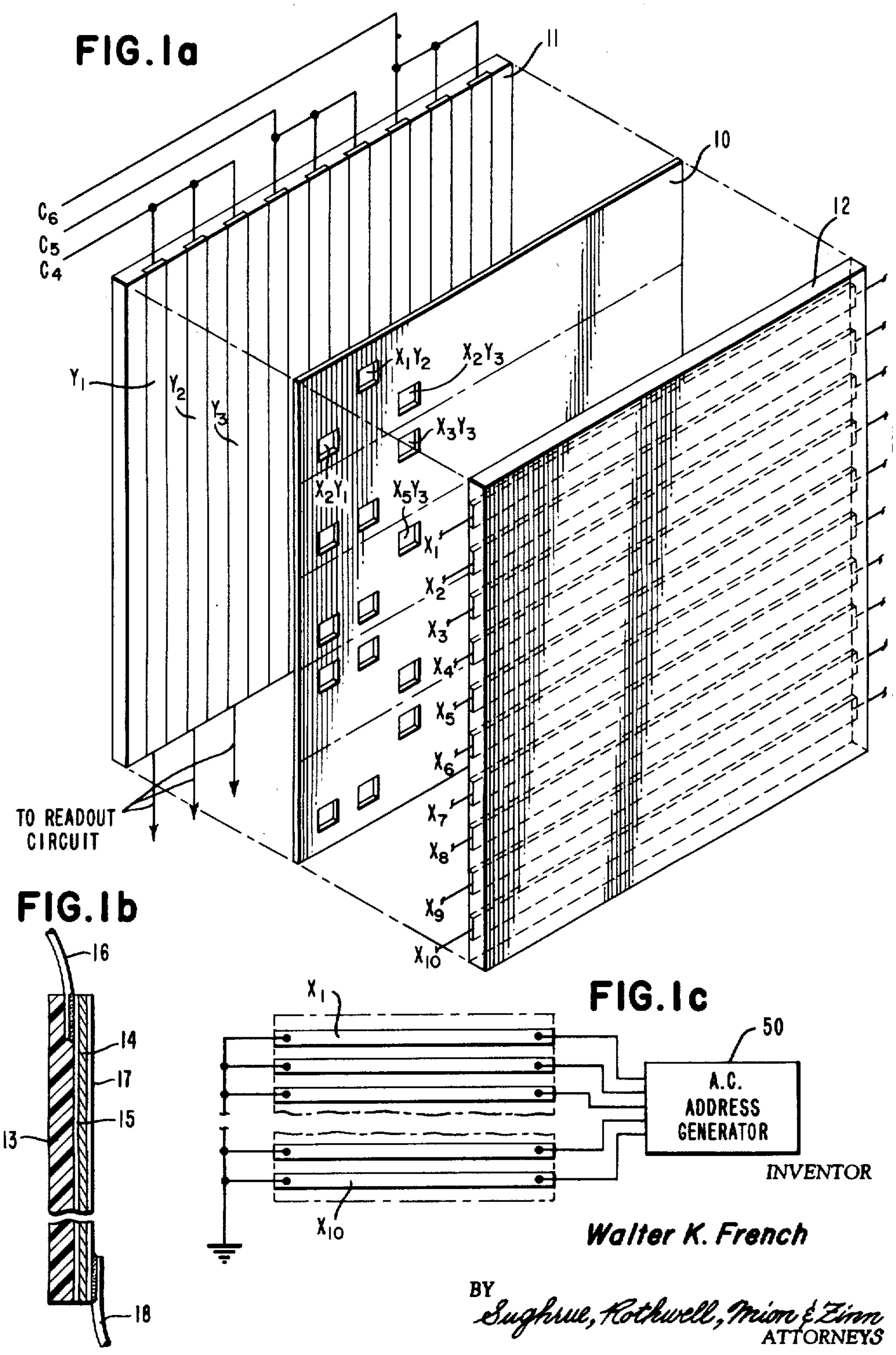

Referring first to FIGURE 1*a*, the record card 10 may be an opaque punched card or tape having discretely defined digit areas thereon. These areas have X and Y coordinates corresponding to the intersecting points of the X and Y electrodes. The Y electrodes in this particular embodiment are composed of photoconductive strips and are carried by the plate 11. The X electrodes are composed of strips of electroluminescent material and are carried by the plate 12. The passage of current through the X strips causes them to luminesce. If the luminescence can read a Y strip, said Y strip will present a reduced impedance to current flow therethrough. As shown particularly in FIGURE 1*b*, the base 13 supports a Y strip 14. To the back of the strip is connected a contact conductor 15 extending the full length of the strip. At the end of the conductor 15 is connected the lead 16 to which is connected a voltage source (not shown). On the opposite side of the strip 14 is connected a second contact conductor 17 also extending the full length of the strip. This conductor 17 may be transparent or quite narrow longitudinally so as not to mask the entire surface of the Y strip. A lead 18 connects at the bottom of the conductor 17. In the absence of a light from an X strip, the strip 14 connecting conductor 17 to conductor 15 provides a high impedance to current flow therethrough. However, if light should radiate the strip 14 at any localized point thereon, said localized point will provide a low impedance path between leads 16 and 18.

Figure 2:
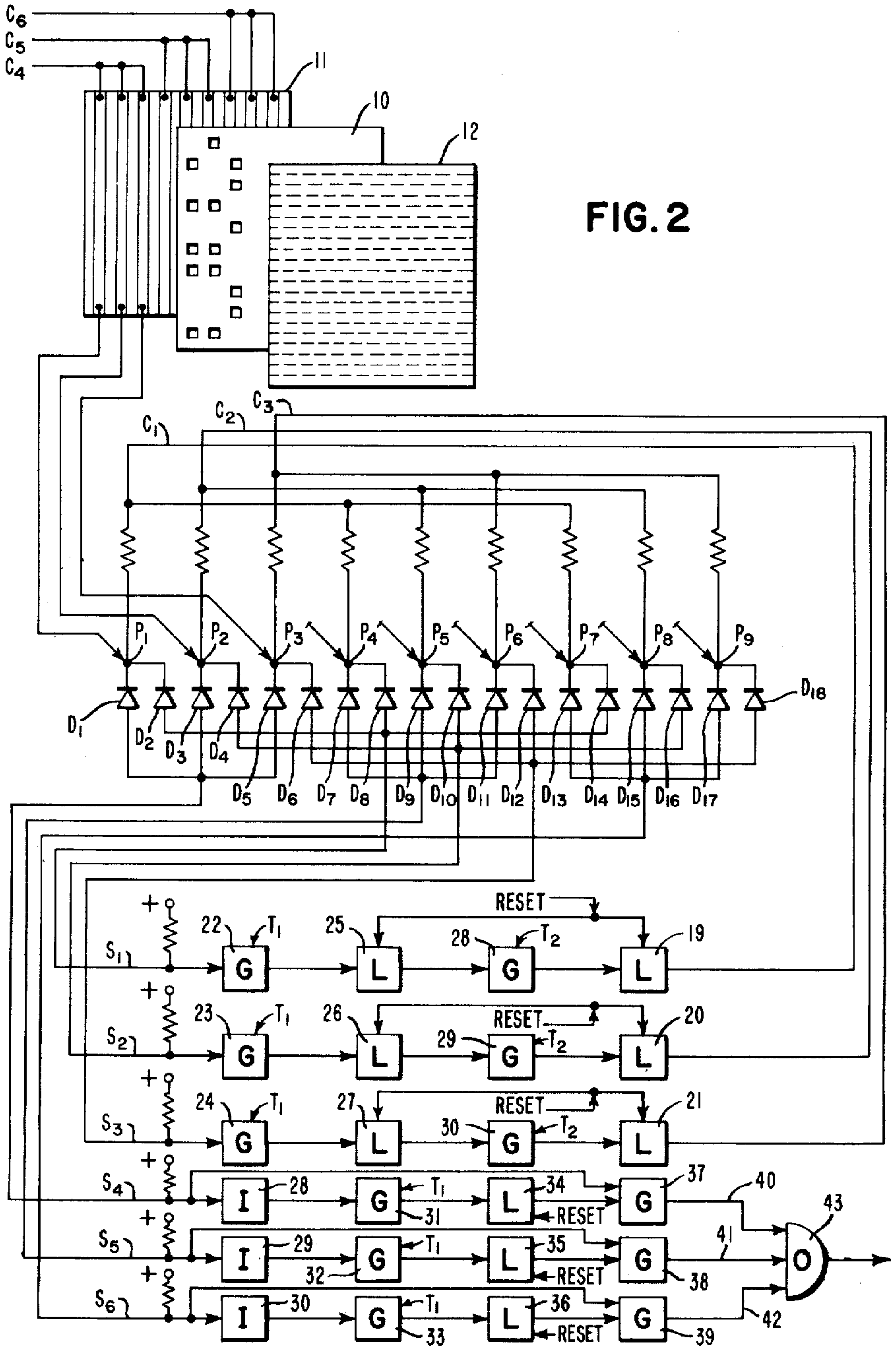
FIGURE 2 is a schematic diagram showing the functioning of the read-out circuitry constructed in accordance with this invention.

As seen in FIGURE 1*a*, positive voltage sources $C_4$, $C_5$, and $C_6$ are connected to leads 16 associated with each of the Y strips. The card 10 is shown as having five horizontal digit areas, each defined by two X strips. The top strip of each pair is the 0 area and the bottom is the 1 area. For instance, the hole at $X_1Y_2$ indicates a 0 and the hole at $X_2Y_3$ indicates a 1. A complete word is contained in each column. For illustration purposes only, let it be considered that the top six X strips contain the tag digits and the bottom four the data digits of the word. The identification tag for the $Y_1$ word is 111, for $Y_2$ word is 011, etc. If we now consider the effect of applying an A.C. signal to the $X_1$ tag line which is connected to the $X_1$ strip, we see that the potential at lead 18 of $Y_1$ is open (no hole at $X_1Y_1$) plus at lead 18 of $Y_2$ (hole at $X_1Y_2$) and open at lead 18 of $Y_3$ (no hole at $X_1Y_3$). By a plus is meant a voltage approximately equal to the positive voltage supply of the $C_4$, $C_5$, or $C_6$. By an "open" is meant an open circuit between leads 16 and 18 of the Y strip. An open circuit between these leads means that the actual voltage of the Y strip lead 18 would be that of its associated P point (FIGURE 2). The A.C. generator 50 of FIGURE 1*c* supplies the necessary signals to the X strips.

Let it now be assumed that the desired word for read-out has a tag of 011 from most to least significant digit. The A.C. address generator introduces an argument tag in the form of A.C. signals on the complement tag digit lines (100). Therefore, A.C. signals are applied to $X_2$, $X_3$, and $X_5$ strips. Due to the hole at $X_2Y_1$, the $Y_1$ strip presents a low impedance and its associated lead 18 has a plus voltage thereon from supply $C_4$. Due to the hole at $X_2Y_3$ or the hole at $X_5Y_3$, strip $Y_3$ presents a low impedance and its associated lead 18 also has a plus voltage thereon from $C_4$. Only on $Y_2$ strip lead 18 is there an open circuit. Thus, the $Y_2$ word is selected by the complement address applied to the tag digit lines. To observe the results of this, reference is now made to FIGURE 2.

Figure 4:
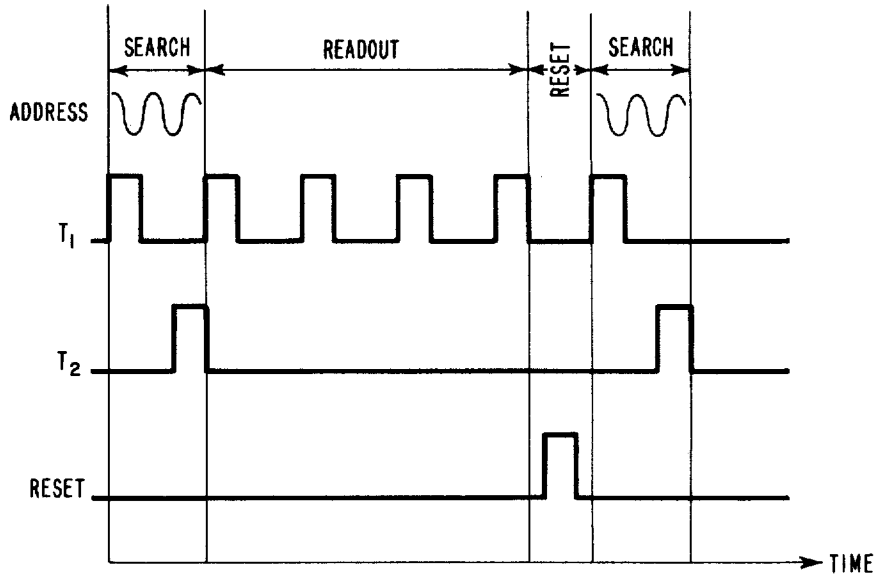
FIGURE 4 is a timing chart showing the relationship of various parts of the cyclic operation of the present invention.

The latches 19, 20, and 21 are normally reset, having their reset outputs down to a relatively low potential with respect to the potential on lines $C_4$, $C_5$, and $C_6$. Latches of the type shown in the patents to Loque, 2,825,821, and Henie, 2,861,199, may be employed. These outputs connect through control lines $C_1$, $C_2$, and $C_3$ through appropriate resistors to the cathodes of diodes $D_1$ through $D_{18}$. Consequently, points $P_1$ through $P_9$ are normally at a potential to forward bias all of the diodes. The voltage to the plate of all the diodes is supplied from the positive supply connected to the input resistors to the gates associated with the sense lines $S_1$ through $S_6$. After the addressing of the memory as described above, $P_1$ and $P_3$ through $P_9$ go positive to block diodes $D_1$, $D_2$, and $D_5$ through $D_{18}$. Since there is no change at $P_2$, diodes $D_3$ and $D_4$ are still forward biased. Therefore, sense lines $S_1$, $S_3$, $S_5$, and $S_6$ go positive. Only $S_2$ and $S_4$ remain negative. Now also referring to the timing chart of FIGURE 4, we see that a pulse at $T_1$ conditions gates 22, 23, and 24. Therefore, as $S_1$ and $S_3$ go positive, gates 22 and 24 are unblocked to set latches 25 and 27 (normally reset). The outputs of these latches are up and at time $T_2$ gates 28 and 30 are unblocked to set latches 19 and 21. The outputs of latches 19 and 21 go up to provide positive voltages to control lines $C_1$ and $C_3$. Latch 20 remains reset so that the control line $C_2$ is still at a low potential at the time of the $T_2$ pulse. During the entire read-out cycle which follows the search cycle, latch 19 is set, latch 20 is reset, and latch 21 is set.

Recalling that sense lines $S_5$ and $S_6$ swing positively, inverters 29 and 30 provide a down level to gates 32 and 33 which are thereby blocked. So latches 35 and 36 remain reset to block gates 38 and 39. However, sense line $S_4$ is down and inverter 28 provides a high level to gate 31 which is unblocked by the $T_1$ pulse to set latch 34. Latch 34 remains set throughout read-out and conditions gate 37. Gate 37 passes to line 40 the condition of sense line $S_4$. The output of OR gate 43 is then indicative of the state of the sense line $S_4$ which in turn is indicative of the data digits of the word in column $Y_2$ since columns $Y_1$ and $Y_3$, which are also connected to $S_4$, are blocked by the presence of a high positive potential on lines $C_1$ and $C_3$ from latches 19 and 21. It can now be seen that regardless of subsequent changes to sense lines $S_5$ and $S_6$, input lines 41 and 42 to OR gate 43 will remain negative. This is because latches 35 and 36 remain reset. Therefore, gates 38 and 39 remain blocked. However, latch 34 has been set to condition gate 37 during read-out.

The search portion of the cycle during which the desired word having the correct identification tag has been found is now completed and the read-out circuitry for the flow of data digits has been established. Now read-out commences.

Figure 3:
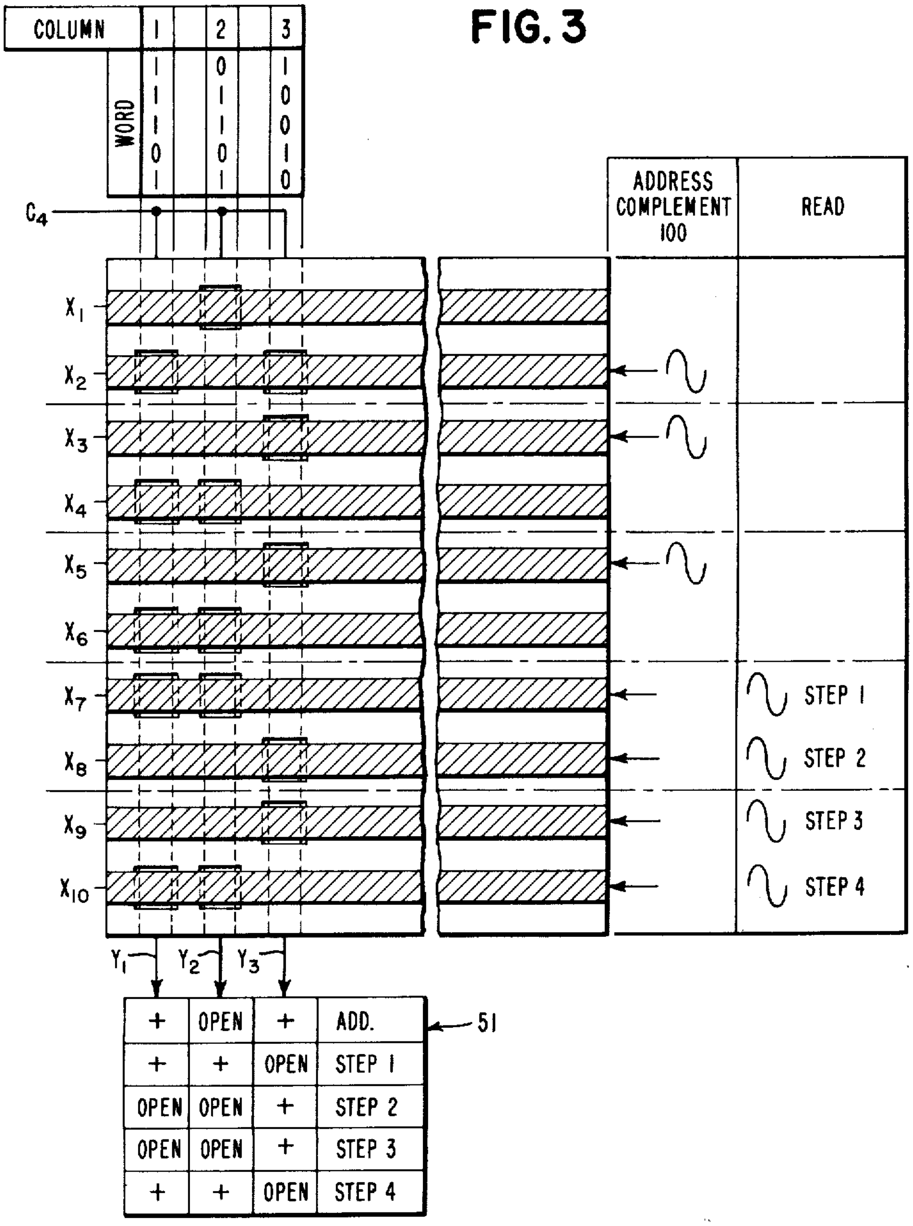
FIGURE 3 is a schematic diagram coupled with a chart to better illustrate the operation of the invention.

Referring now to FIGURE 3, we see that after search, the condition of leads 18 are plus for $Y_1$, open for $Y_2$, and plus for $Y_3$. During read-out each X strip is interrogated sequentially with an A.C. signal from generator 50. At step 1, the zero area of the first digit position of the word is investigated by applying the A.C. signal to strip $Y_7$. Then $Y_8$, $Y_9$, and $Y_{10}$ are similarly interrogated. The results are shown in box 51.

It can be seen that with latches 19 and 21 set and latch 20 reset and control lines $C_1$ and $C_3$ plus and $C_2$ minus, only those diodes having cathodes connected to control line $C_1$ can possibly change their states of conduction as a function of the condition of their associated Y strip. These diodes are $D_3$ and $D_4$ associated with point $P_2$, diodes $D_9$ and $D_{10}$ associated with point $P_5$, and diodes $D_{15}$ and $D_{16}$ associated with point $P_8$. Any change in diodes $D_9$ or $D_{10}$ would result in a change in sense line $S_5$ or sense line $S_2$, both of which cannot affect read-out since control line $C_2$ is negative during read-out regardless of the condition of sense line $S_2$ and line 41 is negative during read-out regardless of the condition of sense line $S_5$. Only the changes of sense line $S_4$ affect the read-out and $S_4$ is connected to diodes $D_1$, $D_3$, and $D_5$. Only diode $D_3$ changes its state of condction as a function of the digits in the $X_2$ column. Therefore, the output of OR gate 43 is strictly a function of the data digits resulting from the interrogation of the column $Y_2$ word.

Previously reference has been made to a no-hole embodiment. By this is meant that the record card may contain the digits in the form of no holes rather than holes. A no-hole at a particular intersection point would indicate the character of the digit.

It is evident that similarity between the word lines Y and the similarity between the digit lines X allow any of the digit line combinations to be used as a tag. For example, memory could search for the word 011XX as previously described, or 1XX01 which is the first column or 0X1X1 which is the second column where the X's represent the data digits. The user is also able to change the tag position at will before each memory search.

What has been described are various embodiments of the present invention. Other embodiments obvious to those skilled in the art from the teachings herein are contemplated to be within the spirit and scope of the following claims.

What is claimed is:

1. An associative memory system comprising storage means for storing words in the form of tag digits identifying each word and data digits associated with each word, individual read-out circuits associated with each of said words, first latching means for inhibiting some of said read-out circuits while enabling the remainder thereof, means to compare argument tag digits introduced to said storage means with the tag digits of each of said stored words in said storage means, means responsive to a match between said argument tag digits and the tag digits of one of said stored words for causing said first latching means to inhibit said some of said individual read-out circuits, a second latching means, said responsive means causing said second latching means to inhibit the remainder of said individual read-out circuits except for said individual read-out circuit associated with said one word whereby a read-out path for the data digits associated with said one word is established through said individual read-out circuit associated therewith.

2. An associative memory system comprising storage means for storing words in the form of tag digits identifying each word and data digits associated with each word, individual read-out circuits associated with each of said words, means to compare argument tag digits introduced to said storage means with the tag digits of each of said stored words and to produce for each word a match signal indicative of a match between said argument tag digits and the tag digits of one of said words and no-match signals for the remainder of said words, means to feed said signals to their associated individual read-out circuits, means responsive to a match signal to establish a read-out path for the data digits of said one word through said read-out circuit associated therewith and means responsive to said no-match signals to inhibit the remainder of said read-out circuits.

3. An associative memory system as claimed in claim 2 in which each read-out circuit includes first and second control points, a first latching circuit controlling said first control point and a second latching circuit controlling said second point, means to feed said signals to both of said latching means to establish a read-out path through said first and second control points of said individual read-out circuit associated with said one word.

4. An associative memory system as claimed in claim 3 further including means to read-out said data digits of said one word through said established read-out path.

5. An associative memory comprising a record member divided into rows and columns and having holes therein representing word digits stored therein, digit and word electrodes on opposite sides of said member and respectively associated with said rows and columns, each of said words being composed of identifying tag digits and data digits, said holes forming electrical connection between coordinate digit and word electrodes, individual read-out circuits associated with each of said words, means for comparing argument tag digits introduced to said digit electrodes with the tag digits of each of said words and means responsive to a match between said argument tag digits and the tag digits of one of said words to establish a read-out path through the individual read-out circuit associated with said one word.

References Cited in the file of this patent

UNITED STATES PATENTS

| | | |
|---|---|---|
| 2,719,959 | Hobbs | Oct. 4, 1955 |
| 2,854,652 | Smith | Sept. 30, 1958 |
| 2,872,666 | Greenhalgh | Feb. 3, 1959 |
| 2,973,508 | Chadurjian | Feb. 28, 1961 |
| 2,996,184 | Barton | Aug. 15, 1961 |
| 3,001,706 | Trussel | Sept. 26, 1961 |
| 3,046,540 | Litz | July 24, 1962 |